United States Patent [19]
Fohrman et al.

[11] Patent Number: 5,227,897
[45] Date of Patent: Jul. 13, 1993

[54] REPRODUCTION OF HOLOGRAMS

[76] Inventors: Scott R. Fohrman, 1123 Linden, Wilmette, Ill. 60091; Steven L. Smith, 3115 W. 41st Pl., Chicago, Ill. 60632

[21] Appl. No.: 518,885

[22] Filed: May 4, 1990

[51] Int. Cl.⁵ .............................................. G03H 1/02
[52] U.S. Cl. ................................... 359/3; 359/15; 425/542
[58] Field of Search .................... 350/3.6, 3.61, 3.66, 350/3.69, 3.7, 3.85; 425/542, 555

[56]  References Cited
U.S. PATENT DOCUMENTS

| | | | |
|---|---|---|---|
| 3,703,407 | 11/1972 | Hannan et al. | 350/3.61 |
| 3,758,649 | 9/1973 | Frattarola | 350/3.61 |
| 4,185,955 | 1/1980 | Holmes et al. | |
| 4,547,141 | 10/1985 | Rushmann | |
| 4,707,321 | 11/1987 | Segawa et al. | |
| 4,717,221 | 1/1988 | McGrew | 350/3.7 |
| 4,758,296 | 7/1988 | McGrew | |
| 4,764,331 | 8/1988 | Tokuhara | |
| 4,773,718 | 9/1988 | Weitzen et al. | 350/3.61 |
| 4,793,953 | 12/1988 | Maus | |
| 4,828,769 | 5/1989 | Maus et al. | |
| 4,831,244 | 5/1989 | Slafer et al. | 350/3.63 |
| 5,013,494 | 5/1991 | Kubo et al. | |
| 5,071,597 | 12/1991 | D'Amato et al. | |

FOREIGN PATENT DOCUMENTS

| | | |
|---|---|---|
| 3736119 | 5/1989 | Fed. Rep. of Germany . |
| 58-132271 | 8/1983 | Japan . |
| 61-221392 | 10/1986 | Japan . |
| 62-30030 | 2/1987 | Japan . |
| 62-79489 | 4/1987 | Japan . |
| 62-80045 | 4/1987 | Japan . |
| 62-101438 | 5/1987 | Japan . |
| 62-119100 | 5/1987 | Japan . |
| 62-128720 | 6/1987 | Japan . |
| 62-146624 | 6/1987 | Japan . |
| WO90/04812 | 5/1990 | PCT Int'l Appl. . |

OTHER PUBLICATIONS

Stephen P. McGrew "Mass Produced Holograms for the Entertainment Industry", pp. 19-20.
"Vacuum Metallizing", Gabower, J. F., *Job Shop Technology*, Feb. 1986, Reference File No. 33, pp. 89, 91, 93, 95, 97, 99 and 101.

Primary Examiner—Bruce Y. Arnold
Assistant Examiner—J. P. Ryan
Attorney, Agent, or Firm—Welsh & Katz, Ltd.

[57] ABSTRACT

A multidimensional, visually readable, diffractive surface grating such as a hologram is reproduced by providing a master grating, generating a negative image plate from the master grating for insertion into a forming device, and replicating the master grating in plasticizable material in the forming device so as to provide a directly visually readable grating.

21 Claims, 2 Drawing Sheets

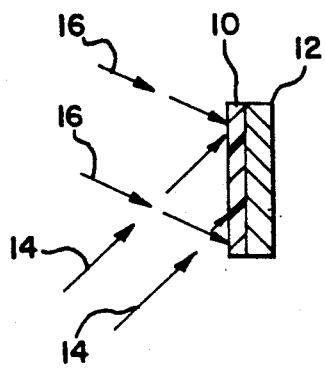
FIG. 1
PRIOR ART
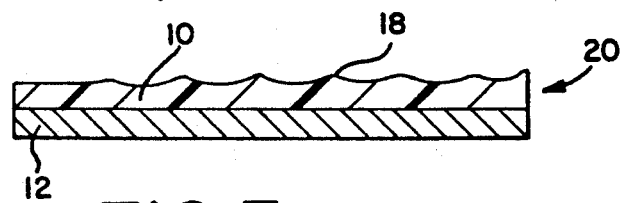
FIG. 2
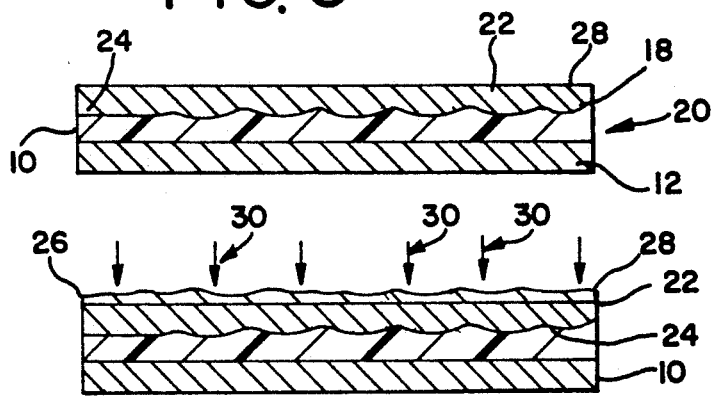
FIG. 3
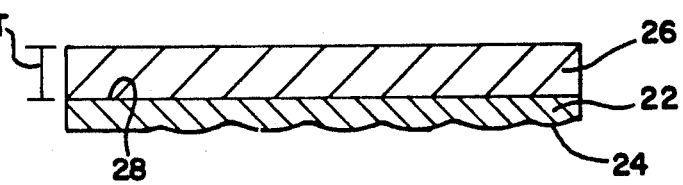
FIG. 4
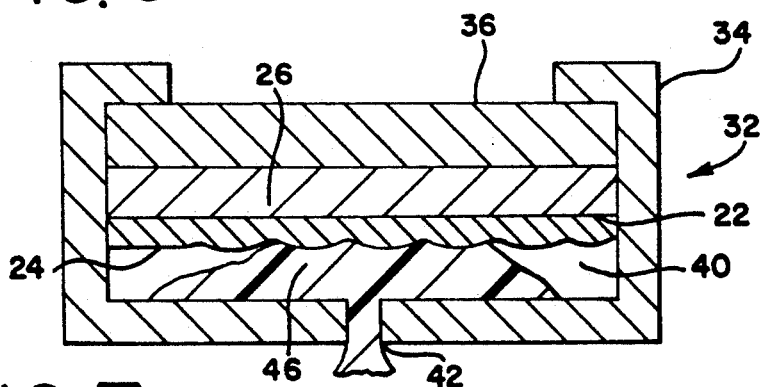
FIG. 5
FIG. 6
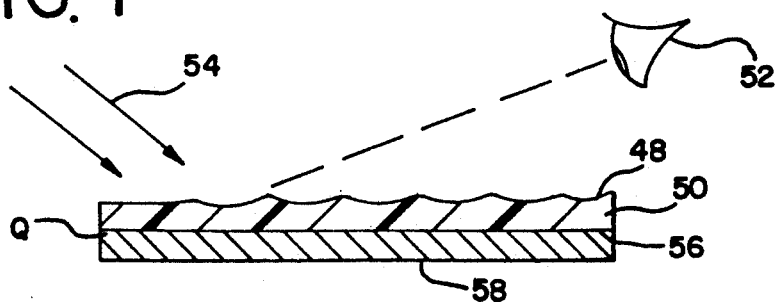
FIG. 7

REPRODUCTION OF HOLOGRAMS

BACKGROUND OF THE INVENTION

The present invention relates to the mass production of visually readable diffractive surface gratings, and specifically to the reproduction of holographic images in multidimensional form.

Mass reproduced holograms are commonplace, appearing on credit cards, security passes, consumer packaging, novelty items, and the like. The holograms allow viewing of images formed in reflective light at locations other than the hologram surface. This can be in the form of a three-dimensional image of an object or of a complex image having different planes.

Such holograms are made by interfering two beams of coherent light at a finite angle with each other on a photosensitive medium. One of the beams interacts with an object whose image is to be recorded, and the other is a reference beam. An image of the object is focused into or near the surface of the resulting hologram by appropriate optical elements, which may include the use of another intermediate hologram. The resulting master hologram is of the surface relief type, i.e., the image formation is stored in surface variations.

Conventional mass produced holograms are manufactured by incorporating the fragile holographic master into a rigid embossing plate in order to emboss replicas. Such a rigid master is formed in an electroless bath on the surface of the photographic master. Multiple masters are them made from this first master for use in embossing holograms with heat and pressure, or by chemical softening, into a surface deformable substrate material. The most common substrate materials into which holograms are embossed include PVC, MYLAR brand plastic film, hot stamping foil, or similar plastic sheet material. Often, such material has been coated with a thin layer of reflective material, such as aluminum, in order to result in a reflective hologram. The aluminum may be vapor deposited onto the substrate in a layer which is just thick enough to provide reflective properties.

A significant disadvantage of such conventionally produced holograms is that a multi-step operation is required to produce a hologram-bearing product. First, the hologram must be transferred onto the embossing foil, after which the foil is applied or attached to another article such as a card, to complete the manufacturing of the product. This type of process may not be cost effective for all applications in which holograms may be used, thus limiting their utility.

Another disadvantage of conventional mass produced holograms is that through the embossing process, there is a degeneration in the optical quality of the hologram from the master to the finished product. A related drawback of the embossing process is that the degree of light reflectance of the reproduced holograms is of a lower quality than that of the master. As such, high quality optical effects are not readily transferrable to a substrate.

Another use for conventional holographic technology is in the production of holographic optical elements (hereinafter referred to as H.O.E.'s), which are holograms having optical quality of a level suitable for use as lenses or mirror devices in optical systems. A single master H.O.E. may act as a complex lens or plurality of lenses. The most common method of production of H.O.E. masters involves a multi-step silver halide developing and fixing process, instead of the embossing process described above. The H.0.E. master is sealed after fixing, and is then tested to ensure its compliance with previously specified requirements of the particular optical system in which it will be employed.

A significant disadvantage of conventional H.O.E.'s is that the multi-step production process is inherently inconsistent, and as such it is difficult to mass produce H.O.E.'s using conventional methods. Thus, efficiency declines as masters which do not meet the specified requirements must be discarded. As a result, the time and cost of producing effective H.O.E.'s is significant. Also, regardless of the inefficiency of the conventional process, since H.0.E.'s must be produced individually, it physically takes a substantial amount of time to produce multiple copies of a single H.0.E.

Thus, there is a need for a method of mass producing holograms in which the hologram is integrally incorporated into the finished product in a single step operation for more cost effective manufacturing, and in order to obtain higher quality optical effects. There is also a need for a method of mass producing H.0.E.'s having consistent and repeatable high quality optical properties.

SUMMARY OF THE INVENTION

Accordingly, a method of reproducing multidimensional, visually readable diffractive surface gratings such as holograms is provided in which a negative image plate is generated from a hologram master for insertion into a forming device, and the hologram is then replicated in the forming device.

More specifically, the master hologram, preferably formed on a piece of sheet material, is provided with a metal coating which forms a negative image of the hologram. A plate is then generated on the rear surface of the metal coating to provide the coating with the required durability to withstand the heat and pressures experienced in an injection molding die. The plate is then separated from the master hologram and inserted into the molding die. Thus, injection molded holograms may be mass produced which have optical properties corresponding to those of the original hologram master, and which are directly visually readable. Holograms produced by the present method are suitable for use as H.0.E.'s, and may be mass produced to provide multiple H.0.E.'s having substantially identical optical characteristics.

BRIEF DESCRIPTION OF THE DRAWINGS

FIG. 1 is a diagrammatic representation of the construction of a hologram;

FIG. 2 is a diagrammatic vertical sectional view of a hologram master as used in the present method;

FIG. 3 is a diagrammatic vertical sectional view of the hologram master of FIG. 2 covered with a metal coating;

FIG. 4 is a diagrammatic vertical sectional view of the generation of a negative plate from the metal coating of FIG. 3;

FIG. 5 is a diagrammatic vertical sectional view of the negative plate resulting from the plate generation procedure of FIG. 4;

FIG. 6 is a diagrammatic representation of an injection molding die used in the present method;

FIG. 7 is a diagrammatic vertical sectional view of a mass produced hologram which has been reproduced according to the present method;

DESCRIPTION OF THE PREFERRED EMBODIMENT

Figure 8:
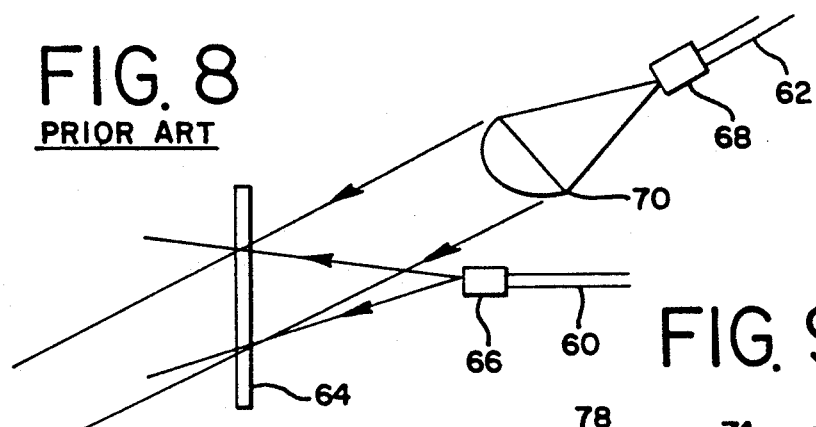
FIG. 8 is a diagrammatic representation of the conventional method of producing H.O.E.'s.

Referring now to FIGS. 1 and 2, a conventional technique is indicated for making a hologram or other form of multidimensional diffractive surface grating. A photosensitive medium 10 such as an emulsion is supported by a glass plate 12 and is illuminated with a source of coherent light which has been split into an object beam 14 and a reference beam 16. The object beam 14 is so named because it carries visual information regarding an object (not shown) placed in the path of the beam 14. The beams 14 and 16 simultaneously intersect and illuminate the medium 10 at a finite angle to form a three-dimensional interference pattern 18. The interference pattern 18 is more commonly known as a hologram, and is capable of reconstructing an image of the object carried by the object beam 12. The emulsion 10, the plate 12 and the interference pattern 18 will be collectively referred to as the hologram master 20.

Referring now to FIGS. 3–5, in order to mass produce holograms by injection molding, or other equivalent processes for forming plastic articles, the hologram master 20 must be provided in a form which will withstand the significant pressures (on the order of 1,000 to 1,500 psi) exerted by conventional injection molding presses, as is well known in the art. To this end, the interference pattern 18 on the hologram master 20 is coated with a layer of liquified metal 22, such as silver. The silver coating 22 is provided in such a consistency that it fills in the irregular surface of the interference pattern 18, and subsequently hardens, forming a negative image 24 of the original pattern.

In view of the fact that the coating or layer 22 is fairly thin and, by itself, would still not withstand the high pressure environment of an injection molding die, additional support is provided to the coating by transforming it into a plate. This is accomplished by generating a plate 26 on a rear surface 28 of the coating 22. The plate 26 may be generated by electroless deposition; however other methods of plate generation are contemplated. Regardless of the process employed, metal is deposited or plated upon the rear surface 28 of the coating 22 and is integrally joined to the coating. In FIG. 4, the generation of the plate 26 is indicated by the arrows 30, which represent the deposition of metal upon the rear surface 28 of the coating 22.

The deposition or plate generation process is carried out until the plate 26 has a thickness 'T' on the order of ¼ inch. After the formation of the plate 26, the master hologram 20 is removed therefrom by breaking away the glass plate 10, a procedure which destroys the interference pattern 18 and the emulsion 10 (best seen in FIG. 5). The plate 26 and the coating 22 are then ready for placement into an injection molding apparatus.

Referring now to FIG. 6, a conventional injection molding apparatus is shown diagrammatically, and is indicated generally at 32. The apparatus or die set 32 comprises therefor a core, which in the present embodiment is the plate 26, and a cavity plate 40. The die set 32 includes a gate 42 which is located in the cavity plate 40. A thermoformable material 46 is injected between the cavity plate 40 and the plate 26 at high pressure and temperature through the gate 42 to fill the space between cavity plate 40 and the plate 26 as is known in the art.

A preferred material 46 is a polycarbonate resin with a relatively high melt value, i.e., on the order of 60, which will promote the flow of the material into all of the irregularities of the negative image 24, and which will produce a transparent product having high quality optical properties. Once the material 46 is cooled, it will be ejected from the die set 32 in the form of a piece or part 50 (best seen in FIG. 7).

Referring now to FIG. 7, the negative image 24 on the plate 26 will cause a positive image 48 to be integrally formed in the piece or part 50. The positive image 48 is a recreation of the interference pattern or image 18 on the hologram master 20, it is directly visible or readable by the human eye 52 when illuminated by a light source 54. One of the advantages of injection molding the part 50 is that multiple identical reproductions of the desired holographic image may be produced from a single master 20.

If desired, a rear surface 56 of the part 50 may be provided with a reflective coating 58 to increase optical efficiency, or to create specific optical effects. The coating 58 may be applied by vacuum metallizing or other equivalent deposition process. The degree of reflectivity of the coating 58 is determined by the thickness 'Q', with a greater thickness resulting in greater reflectivity. In addition, if desired, certain portions of the rear surface 56 may be masked to prevent the deposition of the coating 58 in the masked areas.

Referring now to FIG. 8, the conventional method of producing holographic optical elements (H.O.E.'s) is illustrated. As is the case with the production of holograms as shown in FIG. 1, a beam of coherent light is split into a first beam 60 and a second beam 62, both of which are simultaneously directed at a piece of light-sensitive film 64, with the second beam 62 being oriented so as to impact the film 64 at a finite angle with respect to the first beam 60. Prior to impacting the film 64, the first beam is preferably projected through a diverging lens 66, and the second beam 62 is first projected through a diverging lens 68 and then through a collimating lens 70. The use of the lenses 66, 68, and 70 creates a specified image upon the film 64. The film 64 is then developed by means of a multi-step silver halide developing-fixing-sealing process which is known in the art.

A major disadvantage of the H.O.E. production process depicted in FIG. 8 is that when multiple H.O.E.'s are desired, a separate piece of film 64 must be inserted into the illustrated lens array and then processed for each H.O.E. application. The nature of the developing process is such that each H.O.E. will be slightly different from other H.O.E.'s produced from the same array. Also, those H.O.E.'s which vary excessively from specified parameters must necessarily be discarded, wasting production time and materials.

Another disadvantage of conventional H.O.E.'s made according to the process of FIG. 8 is that the film 64, which, upon processing, becomes the H.O.E., has an internal emulsion structure which performs a specified optical task, depending on the application. Consequently, the internal nature of the emulsion does not provide the three dimensional surface diffractive structures, such as the interference pattern 18 (best seen in FIG. 2) which may be replicated through injection molding by the present method.

Figure 9:
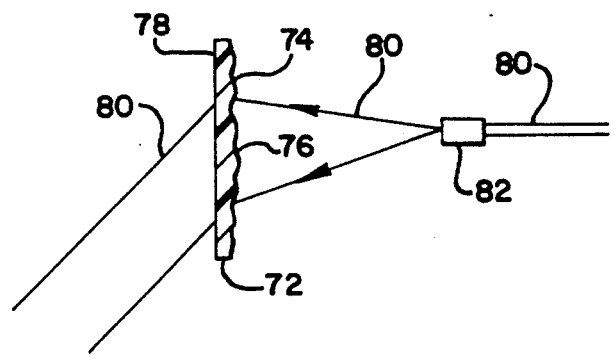
FIG. 9 is a diagrammatic representation of an H.O.E. used for transmission of light.
Figure 10:
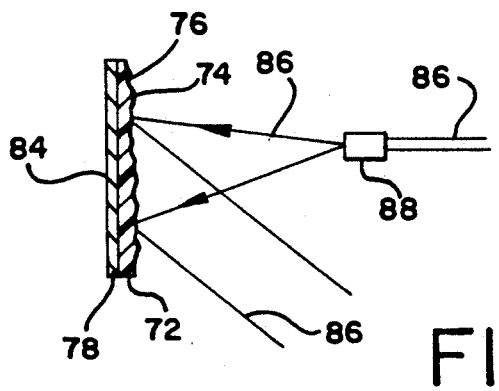
FIG. 10 is a diagrammatic representation of an H.O.E. used for reflection of light.

Referring now to FIGS. 9 and 10, an H.0.E. produced by the present injection molding replication process is designated 72. The H.0.E. 72 is exposed with a specified image in the same manner as the H.0.E. illustrated in FIG. 8; however, the H.0.E. 72 has been plated and produced using the present injection molding replication process in the same manner as the piece 50. The H.0.E. 72 has a front surface 74 which bears a positive interference pattern or image 76, and a rear surface 78. The H.0.E. 72 may be placed in an optical system and may perform at least two types of optical functions, not unlike a lens. Referring now to FIG. 9, a first optical function is that of a transmitting element, in which a beam of light 80 impacting the image 76 from a diverging lens 82 is diffracted upon transmission through the H.0.E. 72. The light beam 80 is thus manipulated in a specified manner by the H.0.E. 72.

Referring now to FIG. 10, a second optical function is that of a reflective element, in which a reflective coating 84 is applied to the rear surface 78 in a similar manner as the coating 58 is applied to the part 50. A beam of light 86 impacting the image 76 from a diverging lens 88 is reflected back towards the lens 88, although the specific orientation of the reflected beam will change depending on the configuration of the optical system in which the H.0.E. 72 is employed.

Figure 11:
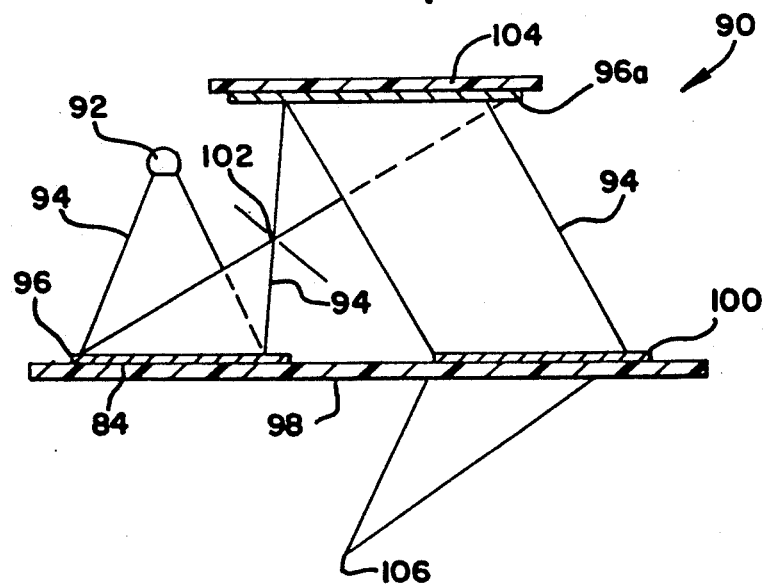
FIG. 11 is a diagrammatic representation of an optical system incorporating H.O.E.'s produced according to the present method.

Referring now to FIG. 11, an optical system employing H.0.E.'s produced according to the present method is generally indicated at 90. The system 90 includes a source of light 92, such as, but not limited to, a laser. The light source 92 directs a beam of light 94 upon a first H.0.E. 96 which is provided with a reflective coating 84, so that the H.0.E. 96 functions as a reflective optical element, in similar fashion to the H.0.E. 72 pictured in FIG. 10. The H.0.E. 96 is integral with a base member 98 which is also provided with a second H.0.E. 100 configured for transmission of light therethrough, as depicted in FIG. 9.

An advantage of the present method is that both H.0.E.'s 96 and 100 may be simultaneously formed in the base member 98 through injection molding, as described above in relation to FIGS. 2-7. This becomes significant for those optical systems in which the relative position of multiple H.0.E.'s is critical for achieving the desired optical result. The relative position of the holographic masters may be fixed, either during the plating stage (described in relation to FIGS. 3-5), or during the placement of the plates 26 into the injection molding die 36 (best seen in FIG. 6). In addition, the base member 98 may be easily replicated via the present injection molding process at relatively low cost without sacrificing optical quality. If desired, and depending on the application, additional H.0.E.'s may be combined in a single base member using the present method.

Once the light beam 94 is reflected from the H.0.E. 96, it passes through an aperture 102 which controls the passage of light therethrough, and which may restrict the passage of certain specified wavelengths, depending on the application. The light beam 94 then is reflected by a second reflective H.0.E. designated 96a, which is substantially similar to the H.0.E. 96 except for the fact that it is the only H.0.E. integral with a base member 104. Upon reflection by the H.0.E. 96a, the light beam 94 is diffracted as it passes through the transmissive H.0.E. 100 so that it is focused upon a visually readable image point 106. The use of H.0.E.'s 96, 96a and 100 as described in relation to the system 90 to illustrate examples of the types of conventional optical tasks which may be performed by H.0.E.'s produced by the present method, with the added advantage that such systems may be replicated more accurately, in less time, and at a relatively lower cost than H.0.E.'s produced by currently available processes.

It will be evident that the method of the invention is capable of mass producing directly visible holograms in a single step, i.e., by injection molding, which was not obtainable by conventional methods of mass producing holograms. Through the injection molding process of the invention, multiple holograms having substantially identical optical characteristics may be produced from a single master, and injection molded holograms will have greater optical quality at a lower production cost. In addition, the versatile nature of injection molding technology also provides an almost limitless variety of hitherto unavailable applications for mass produced holograms. Such applications include packaging, signage, novelties and/or premiums, displays, product embellishment, advertising, transportation safety applications, optical displays, optical elements for single frequency/narrow band optical systems, whether coherent or incoherent, etc.

While a particular embodiment of the present method of reproduction of holograms has been shown and described, it will be appreciated by those skilled in the art that changes and modifications may be made thereto without departing from the invention in its broader aspects and as set forth in the following claims.

What is claimed is:

1. A method for reproducing a multidimensional, diffractive surface grating, comprising:

providing a master grating;

generating an image plate from said master grating for insertion of said plate into a means for forming a flowing, settable material into a part so that the part incorporates a distortion free replication of structural characteristics of said master grating, said image plate including a negative image replication of said master grating and a support plate portion being generated directly on, and integral with a rear surface of said negative image replication for preserving the structure of said negative image replication to maintain the optical characteristics of said master grating replicated therein, said image plate being of sufficient thickness to withstand pressures of the nature exerted by an injection molding press without physically or optically distorting said negative image prior to and during replication in said means for forming the part, the part incorporating a replicate of said master grating for performing a specified optical function by virtue of the optical characteristics of the replicate grating; and injecting a flowing material into said means for forming which will flow over said image plate and subsequently set so as to provide a part incorporating a directly visually readable grating which is a reproduction of said master grating and which performs a specified optical function by virtue of optical characteristics of said reproduced grating.

2. The method as defined in claim 1 further including providing a hologram for the master grating.

3. The method as defined in claim 1 further including generating said plate by an electroless nickel process.

4. The method as defined in claim 1 wherein said negative image replication comprises liquid metal.

5. The method as defined in claim 1 further including employing an injection molding die for said forming means.

6. The method as defined in claim 5 further including replicating said master grating by injection molding.

7. The method as defined in claim 1 wherein said part optically interacts with said readable grating to perform said specified optical function.

8. A method for reproducing a multidimensional, diffractive surface grating, comprising:

providing a holographic master grating on sheet material;

coating said master grating with a layer of liquified metal;

generating a plate on a rear surface of said coating to produce a negative image plate bearing a negative image of said master grating, said negative image plate including a negative image replication of said master grating and a support plate portion being generated directly on, and integral with a rear surface of said negative image replication, for preserving the structure of said negative image replication to maintain the optical characteristics of said master grating replicated therein, said plate being of sufficient thickness to withstand pressures of the nature exerted by an injection molding press without physically or optically distorting said image plate prior to and during replication in a means for forming a flowing, settable material into a part, the part incorporating a replicate of said master grating for performing a specified optical function by virtue of the optical characteristics of the replicate grating;

separating said master grating from said plate;

inserting said plate into said means for forming a flowing, settable material into a part so that the part incorporates a distortion free replication of structural characteristics of said master grating; and injecting a flowing material into said means for forming which will flow upon said image plate and subsequently set so as to provide a part incorporating a directly visually readable grating which is a reproduction of said master grating and which performs an optical, lens-like function by virtue of optical characteristics of said reproduced grating.

9. A multidimensional, diffractive surface grating produced by generating a negative image plate from a master grating for insertion into a means for forming a flowing, settable material into a part so that the part incorporates a distortion free replication of structural characteristics of said master grating, said negative image plate including a negative image replication of said master grating and a support plate portion being generated directly on, and integral with a rear surface of said negative image replication, for preserving the structure of said negative image replication to maintain the optical characteristics of said master grating replicated therein, said plate being of sufficient thickness to withstand pressures of the nature exerted by an injection molding press without physically or optically distorting said negative image prior to and during replication in said means for forming the part, the part incorporating a replicate of said master grating for performing a specified optical function by virtue of the optical characteristics of the replicate grating, and injecting a plasticizable material into said means for forming to flow upon said image plate so that when said material sets, said image is incorporated into a part produced simultaneously with said surface grating and which performs a specified optical function by virtue of the characteristics of said surface grating.

10. The surface grating as defined in claim 9 wherein said master grating is a hologram.

11. The diffractive surface grating as defined in claim 9 wherein said part optically interacts with said grating to perform said specified optical function.

12. A method for reproducing a multidimensional, holographic optical element having a diffractive surface structure, comprising:

providing a master surface relief holographic optical element;

generating a negative image plate from said master element for insertion into a means for forming a flowing, settable material into a part so that the part incorporates a distortion free replication of structural characteristics of said master element, said negative image plate including a negative image replication of said master element and a support plate portion being generated directly on, and integral with a rear surface of said negative image plate, said plate being of sufficient thickness to withstand pressures of the nature exerted by an injection molding press without physically or optically distorting said holographic optical element prior to and during replication in said means for forming the part, the part incorporating a replicate of said master element for performing a specified optical function by virtue of the optical characteristics of the replicate grating; and injecting a plasticizable material into said means for forming which will flow upon said image plate and set so as to provide a directly visually readable, replicate holographic optical element in said part which replicates optical properties of said master surface relief holographic optical element for manipulating in a specified manner light which interacts with said replicate holographic optical element.

13. The method as defined in claim 12 wherein said holographic optical element is of the transmissive type.

14. The method as defined in claim 12 wherein said holographic optical element is provided with a reflective coating on a surface thereof.

15. The method as defined in claim 12 wherein a plurality of multidimensional, visually readable, holographic optical elements are integrally replicated on a single base member.

16. The method as defined in claim 12 wherein said part optically interacts with said readable grating to perform said specified optical function.

17. A multidimensional, diffractive holographic optical element produced by generating a negative image plate from at least one master element for insertion into a means for forming a flowing, settable material into a part so that the part incorporates a distortion free replication of structural characteristics of said master element, said negative image plate including a negative image replication of said master element and a support plate portion being generated directly on, and integral with a rear surface of said negative image, for preserving the structure of said negative image replication to maintain the optical characteristics of said master element replicated therein, said plate being of sufficient thickness to withstand pressures of the nature exerted by an injection molding press without physically or optically distorting said negative image prior to and during replication in said means for forming the part, the part incorporating a replicate of said master element for performing a specified optical function by virtue of the optical characteristics of the replicate grating, and injecting a flowing plasticizable material into said means for forming which will flow upon said image plate and set to provide said part including a directly visually readable, replicate holographic optical element which replicates optical properties of said at least one master element for manipulating light in a specified manner.

18. The element is defined in claim 17 wherein said replicate holographic optical element is of the transmissive type.

19. The element as defined in claim 17 wherein said replicate holographic optical element is provided with a reflective coating on a surface thereof.

20. The element as defined in claim 17 wherein at least one of said replicated holographic optical elements is selectively provided with a reflective coating on a surface thereof.

21. The element as defined in claim 17 wherein said part is configured to optically interact with said replicate holographic optical element to manipulate light in said specified manner.

* * * * *